(12) United States Patent
Fischer et al.

(10) Patent No.: US 6,453,894 B1
(45) Date of Patent: Sep. 24, 2002

(54) POWER RING ADAPTER ASSEMBLY

(76) Inventors: James J. Fischer, 6020 Quayle Creek Dr., Tyler, TX (US) 75703; James Jureski, 14308 Hwy. 64 East, No. 9, Tyler, TX (US) 75707

( * ) Notice: Subject to any disclaimer, the term of this patent is extended or adjusted under 35 U.S.C. 154(b) by 0 days.

(21) Appl. No.: 09/718,145

(22) Filed: Nov. 21, 2000

Related U.S. Application Data (60) Provisional application No. 60/167,948, filed on Nov. 29, 1999.

(51) Int. Cl.$^7$ ................................................ F02M 25/10
(52) U.S. Cl. ...................................... 123/585; 123/1 A
(58) Field of Search ............................... 123/1 A, 585, 123/DIG. 12, 198 A (56) References Cited

U.S. PATENT DOCUMENTS

| | | | |
|---|---|---|---|
| 5,699,776 A | 12/1997 | Wood et al. | 123/531 |
| 5,743,241 A | 4/1998 | Wood et al. | 123/531 |
| 5,839,418 A | 11/1998 | Grant | 123/585 |
| 5,890,476 A | 4/1999 | Grant | 123/585 |
| 5,967,099 A | 10/1999 | Patrick | 123/1 A |
| D420,364 S | 2/2000 | Fischer et al. | D15/9.1 |

*Primary Examiner*—Tony M. Argenbright
*Assistant Examiner*—Katrina B. Harris
(74) *Attorney, Agent, or Firm*—C. W. Alworth (57) ABSTRACT

An adapter for retrofitting to a stock engine for use in performance racing. The adapter is fitted between a stock air filter and a stock throttle or carburetor and provides a safe and secure mounting point for nitrous oxide/fuel injection nozzles or spray bars. Two embodiments are disclosed: the first for use directly between the air filter and the throttle body or carburetor and the second for installation using standard air hoses.

16 Claims, 12 Drawing Sheets

POWER RING ADAPTER ASSEMBLY

This application claims the benefit of U.S Provisional Application No. 60/167,948, filed on Nov. 29, 1999.

TECHNICAL FIELD OF THE INVENTION

The present invention relates generally to a nitrous oxide supplemental fuel system employed with standard intake systems and used in the performance racing industry.

BACKGROUND OF THE INVENTION AND PRIOR ART

Performance racing encompasses all areas of the sport of racing that includes drag racing, stock car racing, speedboat racing and such. Performance racing has become one of the major spectator sports in the United States and fans from all walks of life share in the sport both as spectators and participants. There are basically two types of participants—amateur and professional. It is the fact that amateurs can participate that has made performance racing such a popular sport. It should be noted that there is little difference between the amateur participant and the professional participant: the real difference being that the amateur has other employment besides racing, which helps fund his sport.

Simply put "performance" in performance racing means maximizing the horsepower from a given 'stock' engine. There are numerous methods, techniques, additions, etc. that are used to improve horsepower. These techniques range from boring out cylinders, increasing the compression ratio, modifying the inlet and exhaust manifolds (tuning), modifying pistons, changing fuels from gasoline to alcohol, etc. Probably the most popular technique for improving horsepower involves the addition of Nitrous Oxide—$N_2O$ to the engine fuel-air system. Nitrous Oxide (laughing gas—used by the dental industry as a anesthetic) provides oxygenation to regular fuel. Essentially the oxygen radical releases more readily to oxygenate the fuel then does the $O_2$ molecule in regular "air." It would be the same as injection of pure oxygen into the engine; however, $N_2O$ is much safer. Pure oxygen in direct contact with hydrocarbons spontaneously reacts (explodes); whereas, $N_2O$ and fuel requires a source of ignition.

There are several techniques used to add nitrous oxide to the fuel-air system in an engine although all of the techniques share a common mode. Essentially the common mode is the engine's regular intake system (carburetor or throttle body) coupled with a technique, method, or device to inject a metered combination of fuel and nitrous oxide into the engine whenever the driver desires more horsepower (greater speed) from the engine. Throughout this disclosure, the term ancillary fuel will mean that fuel added to the engine for on-demand increased horsepower.

One method involves injecting a metered mix of ancillary fuel and nitrous oxide into each cylinder on demand. Basically this method is simple fuel injection—a well-known technique. It is very complex for the rank amateur to install such a system on a stock engine because injection ports must be added to each cylinder on the engine. The addition of injection ports involves complex machining and puts this approach out of the means of most participants.

One popular technique involves the addition of a spray bar beneath the regular throttle body or carburetor between the throttle body or carburetor and the intake manifold to provide the mix of ancillary fuel and nitrous oxide. The device is actually a plate (about ½-inch thick) that contains two conduits each with a series of apertures. One conduit is connected to a source of nitrous oxide and the other conduit is connected to the source of fuel. Whenever the race driver desires increased horsepower, he presses a button in the driving compartment that opens a series of solenoid valves, which in turn pass fuel and nitrous oxide to the spray bar. The fuel-nitrous oxide mixture is then drawn through the intake manifold and into the engine cylinders where it is burnt.

Another popular technique involves the addition of a spray nozzle (or injection nozzle) in the air-fuel intake leading from the air filter to the throttle body or carburetor and into the engine. A spray nozzle mixes auxiliary fuel and nitrous oxide in the proper proportion for "power-injection" into the engine. (Similar to the spray bar assembly described above.) Stock automobiles have two techniques for transferring air from the air filter to the throttle body or carburetor. In the first technique, the air filter is mounted on top of and directly to the carburetor or throttle body. In the other technique, the air filter is mounted away from the carburetor/throttle body and intake air line or air ducting are (is) run between the air filter and the carburetor/throttle body.

Depending on the type of technique (air filter on top of carburetor/throttle body or air filter separate from carburetor/throttle body) used in a stock engine, the user will either jamb the spray nozzle (or nozzles) into the air filter housing or literally poke a hole (or holes) in the air ducting and use any technique that can be imagined to hold the spray nozzle in place. Usually the air ducting is made from thin plastic ripple-extruded tubes having a diameter varying between three and six inches. Being plastic, there is really no mechanical strength and the spray nozzle can fall out of the ducting. In a similar manner, the nozzle can fall out of the air filter housing. This then creates a fire hazard because, when the nozzle is no longer in its proper place, the unburned fuel and nitrous oxide is sprayed into the engine compartment.

The prior art goes mainly to the spray nozzle (U.S. Pat. No. 5,699,776 to Wood et al., U.S. Pat. No. 5,890,476 to Grant, and U.S. Design Pat. No. D 420,364 to the present inventors), or to the spray bar plate which is to be located between the throttle body or carburetor and the engine (U.S. Pat. No. 5,743,241 to Wood et al. and U.S. Pat. No. 5,839,418 to Grant).

Wood, U.S. Pat. No. 5,743,321, discloses a Nitrous. Oxide Plate System, which shows the nitrous oxide (oxidizer) bar above the fuel bar. In his disclosure Wood states that ". . . the overall flow of air through the carburetor increases when the oxidizer system is in operation, and the level of vacuum in the carburetor increases." Thus, it is clear that the device is designed to be used in a carbureted system. Further the disclosure clearly indicates that the device is designed to be placed between the intake manifold and the carburetor. (I.e., mounted under the carburetor.) Grant, U.S. Pat. No. 5,839,418, discloses a Dual Stage Nitrous Oxide and Fuel Injection Plate, which also shows the nitrous oxide bar above the fuel bar. Additionally, Grant discloses a "crossed set" of spray bar pairs.

Other prior art found by the inventors shows or discloses various fuel nozzles in which fuel and oxidizer are mixed and sprayed into the manifold. Wood, U.S. Pat. No. 5,699,776 discloses a spray nozzle assembly that ". . . is installed in a threaded opening in the wall . . . in an intake manifold of an engine . . . " The disclosure goes on to teach that a nozzle is required for each cylinder of the engine. Grant, U.S. Pat. No. 5,890,476, also discloses a spray nozzle assembly ". . . for mounting to a manifold of an internal combustion engine . . . " Grant, unlike Wood, implies that only one nozzle is needed. Patrick, U.S. Pat. No. 5,967,099, discloses a complex apparatus to inject nitrous oxide into ". . . the engine's air intake . . . " The disclosure does not explain how the associated injection nozzle should be mounted. Fischer and Jureski, U.S. Pat. No. D 420,346 to the current inventors, disclose a gas-fuel nozzle. The disclosure is a design and does not indicate a method of use or installation for the nozzle.

Thus, there remains a need for an adapter which can safely support a spray nozzle and be capable of solid installation within plastic air ducting used in the air intake system of stock engines or placed between the air filter and the carburetor/throttle body.

SUMMARY OF THE INVENTION

The instant invention consists of a cylindrical adapter ring which can be metal or molded plastic. The cylindrical adapter—power ring—has several standard diameters between two and six inches, which matches the plastic air ducting used in stock automobile engines or matches the diameter of the intake throat between the air filter and the carburetor/throttle body. (Typical diameters are three inches for tubing and four inches for carburetor/throttle body throats.) The width of the device varies between one and one-half inches to three inches. One or more spray nozzles can be installed in the invention depending on requirements.

The device is used in one of two ways. For air filters directly mounted to carburetors/throttle bodies, the device is placed between the air filter and the intake throat. The air filter is then placed over the device and the existing supports, or anchoring mechanism, for the air filter is used to hold both the device and the filter in place on the carburetor/throttle body. Gas and fuel lines are then attached to the spray nozzle(s) and the device is now ready for service. For separate air filters the device is placed at a convenient location in the plastic air ducting running from the air filter to the intake throat. On the other hand, if there is not enough room for the first embodiment, then air ducting may be employed. The user would mount the air filter at a convenient location, use air ducting between the air filter and the carburetor/throttle body, and place the second embodiment within the air ducting.

CATALOG OF THE ELEMENTS

To aid in correlating the elements of the instant invention to the drawings, the following table is provided:
1 Generally the first embodiment
2 Generally the second embodiment
3 First nozzle—first embodiment
4 Second nozzle—first embodiment
5 Air Filter
6 Intake Manifold
7 Carburetor or Throttle Body
8 First Nozzle—second embodiment
9 Second nozzle—second embodiment
10 Body—first embodiment
11 Upper Lip
12 Lower Lip
13 Injection Nozzle
14 Injection Nozzle
20 Body—second embodiment
21 First Lip—second embodiment
22 Second Lip—second embodiment
23 Injection Nozzle
24 Injection Nozzle
31 Upper Spray Bar Assembly
32 Lower Spray Bar Assembly
33 Lower Upper Spray Bar Assembly
34 Lower Lower Spray Bar Assembly
35 Generally the Spray Bar Conduit
36 Generally the Spray Bar Fitting
37 Generally the Plug

DETAILED DESCRIPTION OF THE EMBODIMENTS

Figure 1:
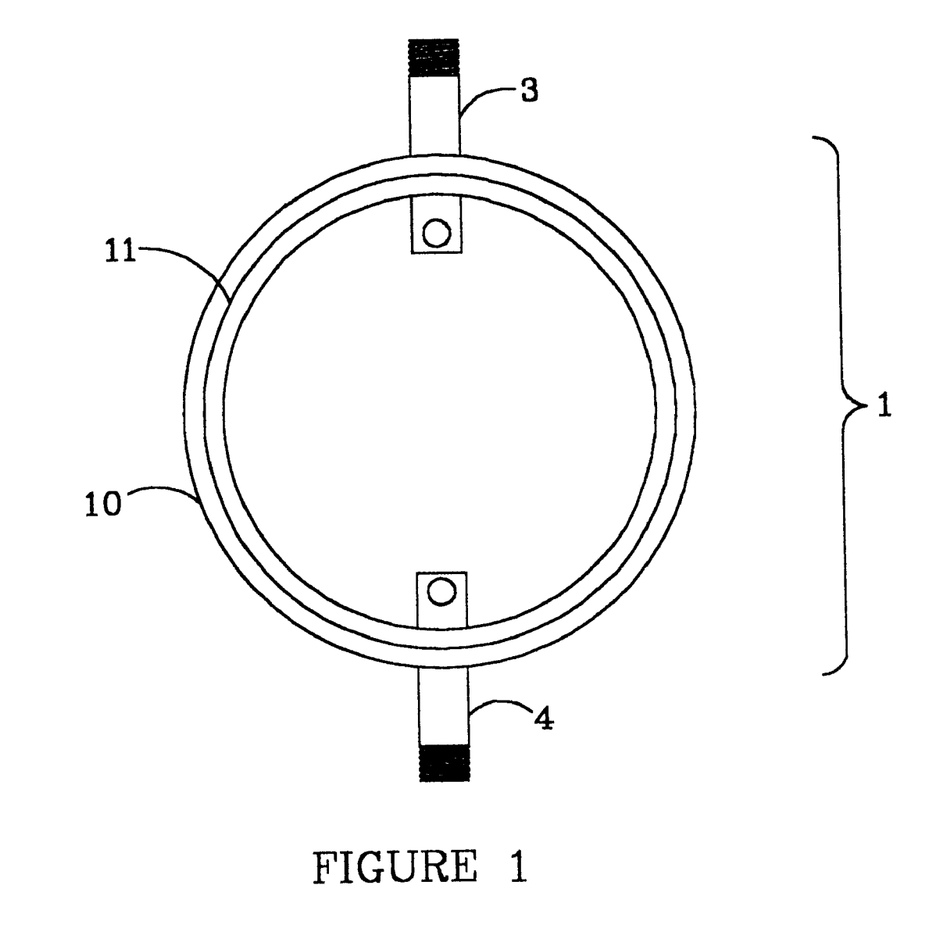
FIG. 1 is a top end view of the first embodiment of the instant device.
Figure 2:
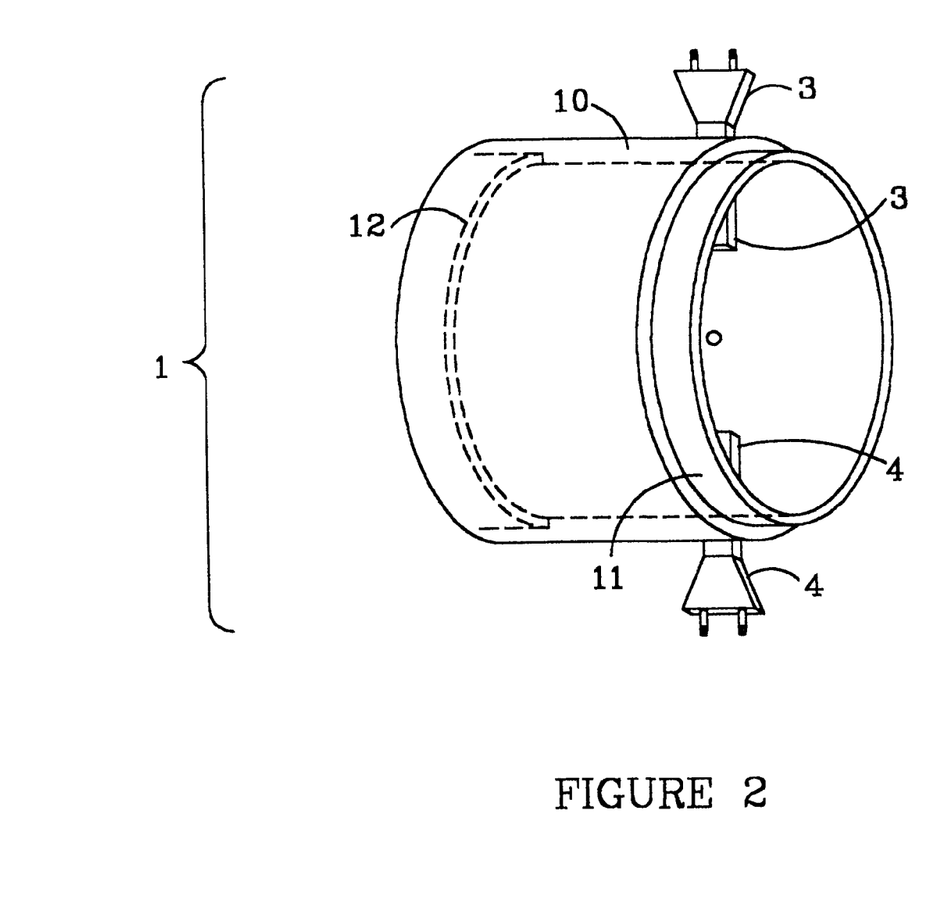
FIG. 2 is an isometric view of the first embodiment of the instant device.
Figure 3:
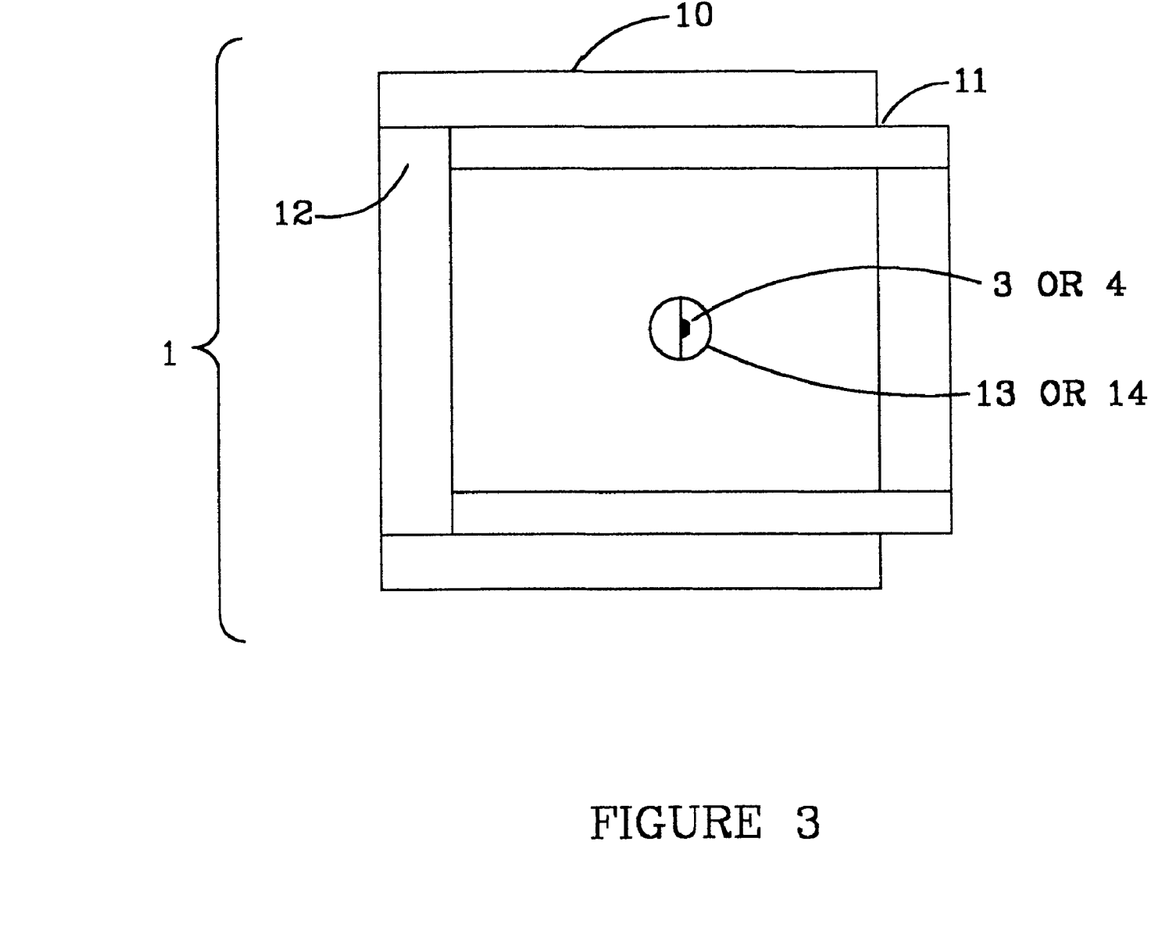
FIG. 3 is a cross-sectional side view of the first embodiment of the instant device.
Figure 4:
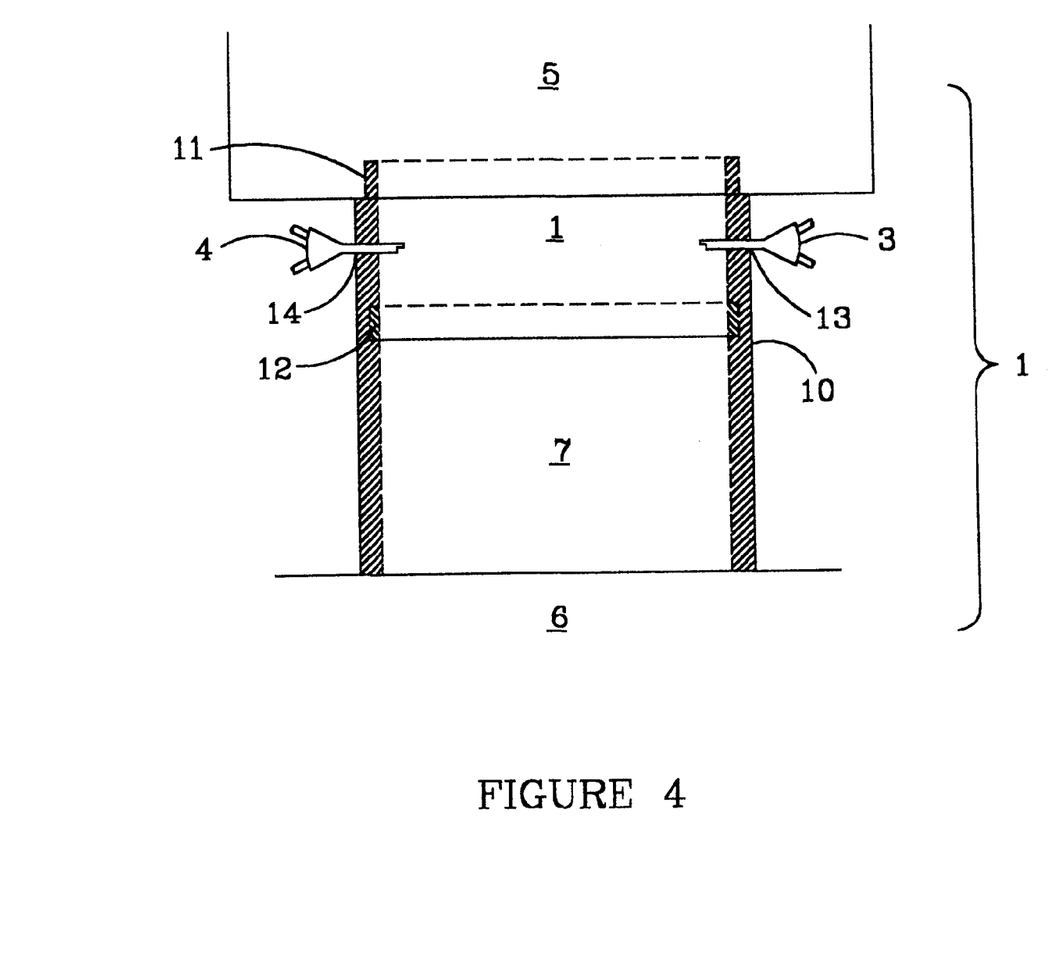
FIG. 4 is a cut-away side view of the first embodiment of the instant device shown in place under an air filter and on top of a carburetor or throttle body.
Figure 5:
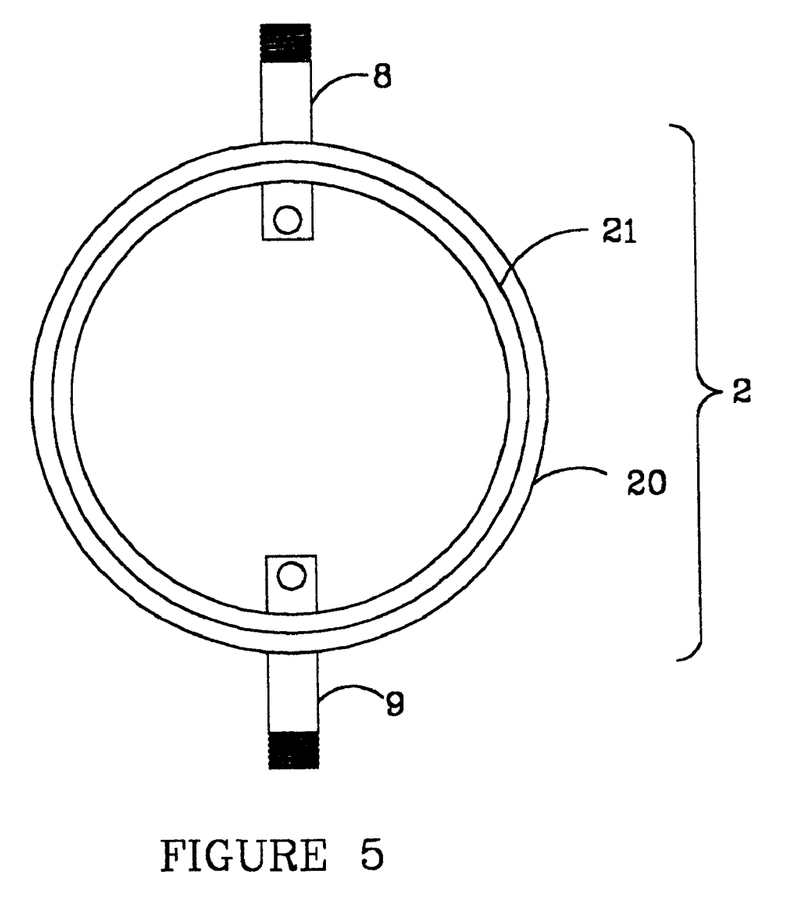
FIG. 5 is an end view of the second embodiment of the instant device.
Figure 6:
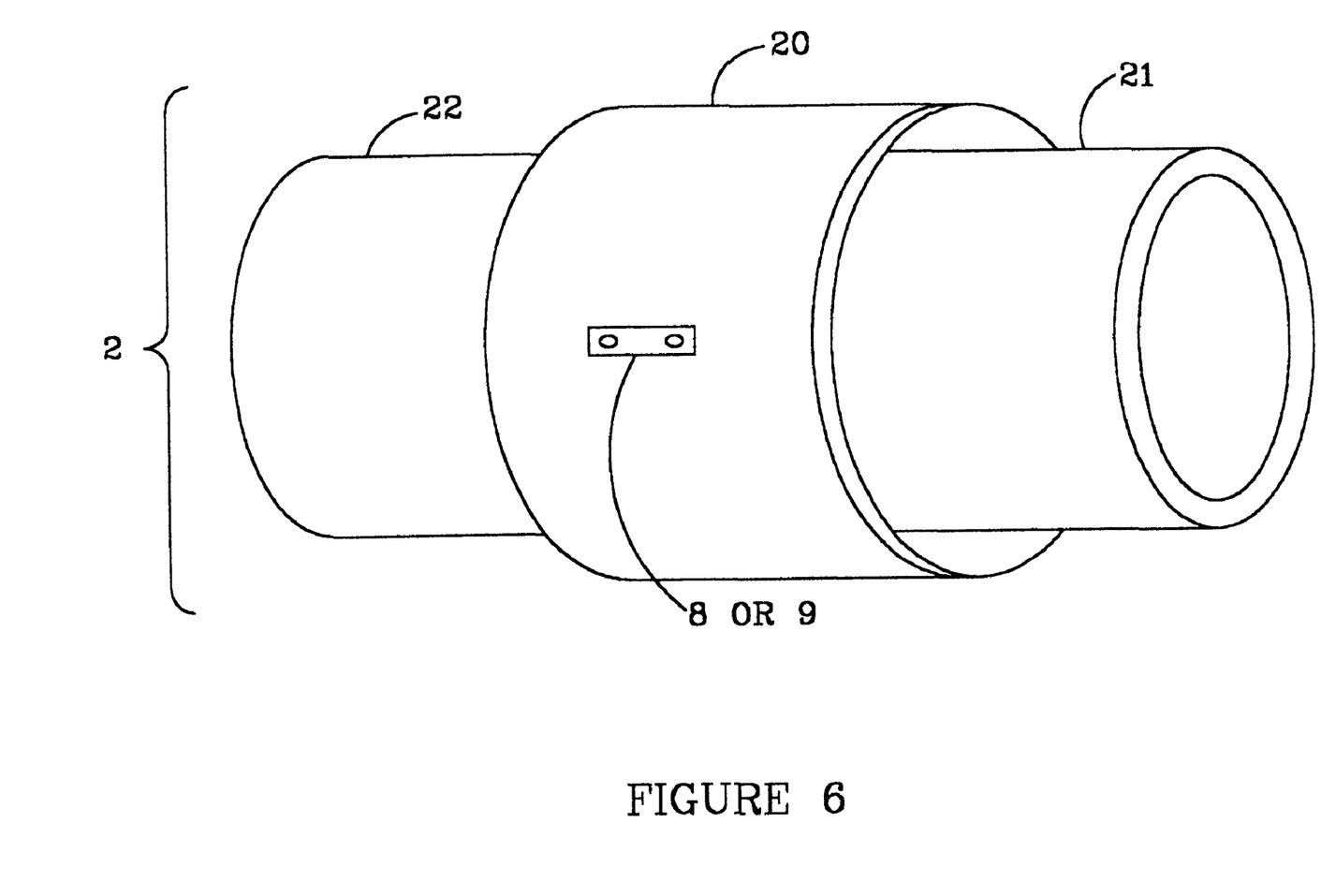
FIG. 6 is an isometric view of the second embodiment of the instant device.
Figure 7:
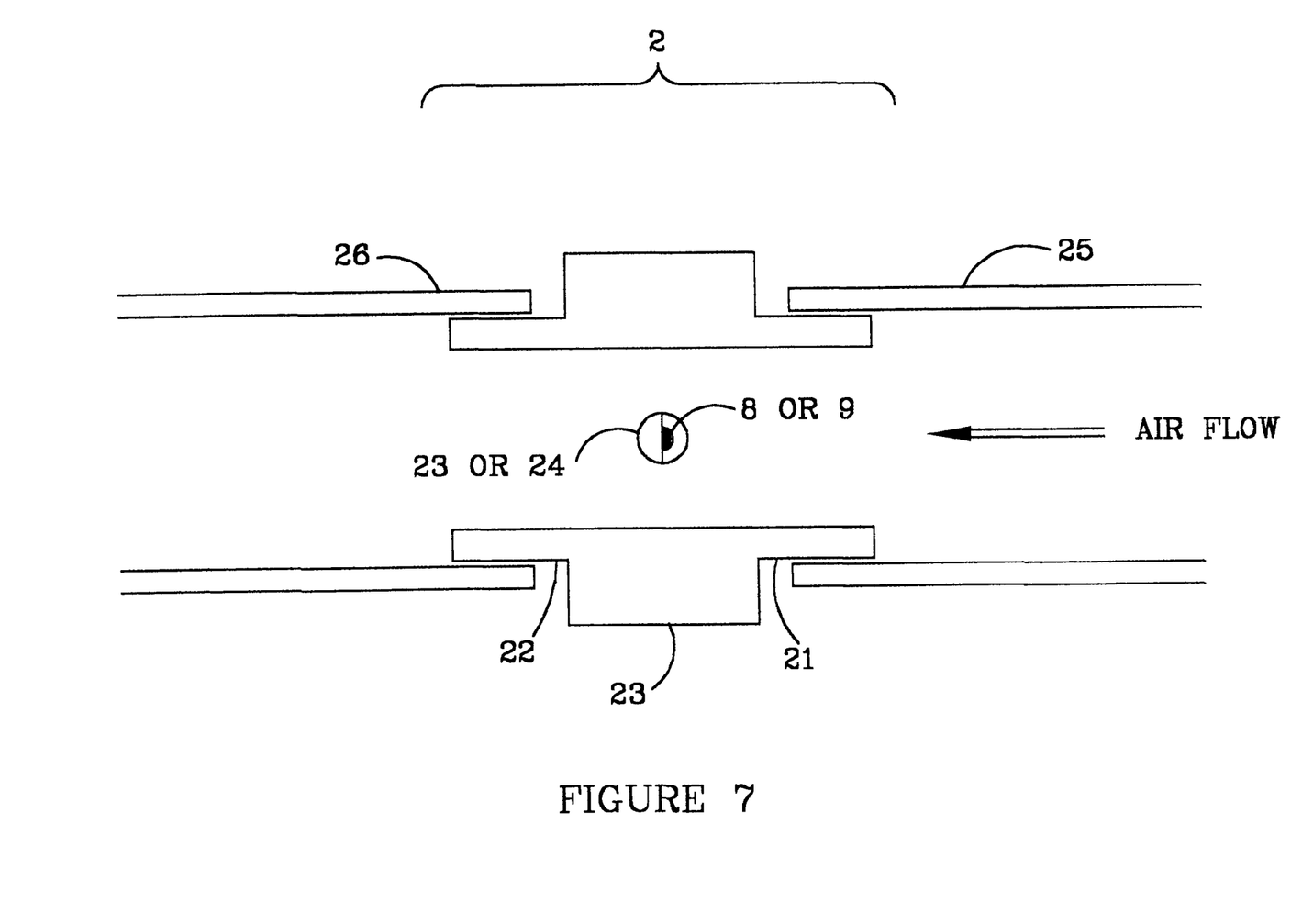
FIG. 7 is a cross-sectional view of the second embodiment of the instant device shown installed in air-intake hose or air ducting.

The instant invention is shown in the accompanying FIGS. 1 through 9. A first embodiment is shown in FIGS. 1 through 4; whereas, a second embodiment is shown in FIGS. 5 through 7. It should be noted that FIGS. 1 through 7 show the two embodiments of the instant device using a nozzle for fuel/nitrous oxide injection. FIGS. 8A, 8B, 9A, and 9B show two further alternatives to the nozzle, which utilize spray bar pairs. The instant device consists of a cylindrical base or body that can be machined from metal or molded from heavy-duty high temperature plastic. FIG. 4 illustrates how the device is installed on top of a basic fuel control system such as a throttle body or carburetor. FIG. 7 illustrates how the device is installed within air intake ducts found in stock automobiles. From henceforth the term throttle body includes carburetor and may be referred to as a basic fuel control system.

Referring to FIGS. 1 through 4 the first embodiment, for use between an air filter and a throttle body will be described. The instant device, 1, is approximately four inches in diameter with the overall outer diameter being set by the size of the throttle body intake throat. As shown in the figures, there are two lips, 11 and 12, associated with the device. The upper lip, 11, is approximately 3/14 inches in axial length and extends from the outer wall of the cylinder or body, 10, into the wall of the cylinder by approximately 0.2 inches. The lip is designed to fit inside the bore of an air filter, 5, and is essentially the same dimension as the equivalent lip on the throttle body, 7. The lower lip, 12, is the opposite of the upper lip and is about ¾ inches in axial length. The lip extends from the inner wall of the device into the wall of the cylinder by about 0.2 inches. Essentially this lip has the same dimensions as the bore of the air filter and is designed to fit the lip of the throttle body.

One or more injection apertures, 13 and 14, are placed in the walls of the cylinder approximately midway between the two lips. Spray nozzles, 3, and 4 are inserted into its respective aperture. The number of injection apertures and associated spray nozzles is set by the power requirements of the user and varies from one to a plurality. The actual position of the nozzle (or nozzles) radially about the cylinder, 10, is set by the type of throttle body on which the instant device is used. Essentially, the position (or positions) must be chosen so that the nozzles do not interfere with other mechanical parts on the throttle body. In ordering the instant device, the user would specify the type of throttle body, and the manufacturer would then position the injection aperture (or apertures) and associated spray nozzle (or nozzles) before releasing the device to the customer. Although two nozzles are shown, the device can accept a plurality of such nozzles, and a single nozzle may be acceptable.

FIG. 4 shows the first embodiment of the instant device in place on a throttle body, 7. The air filter, 5, is then placed on top of the device, 1. The device and air filter are kept in place with existing hardware. Some extension links may be required in order to be able to use the existing hardware.

Referring to FIGS. 5 through 7, the second embodiment, for use with air ducting, will be described. The instant device, 2, is approximately three inches in diameter with the overall outer diameter being set by the size of the air ducting, although diameter adapters, not shown, may be employed. As shown in the figures, there are two lips, 21 and 22, associated with the device. Both lips are approximately ½ inches in axial length and extend from the outer wall of the cylinder, 20, into the wall of the cylinder, 20, by approximately 0.1 inches. The lips are designed to fit inside the air ducting, 25 and 26.

One or more injection apertures, 23 and 24, are placed in the walls of the cylinder approximately midway between the two lips. Spray nozzles, 8 and 9 are inserted into its respective aperture. The number of injection apertures and associated spray nozzles is set by the power requirements of the user and varies from one to a plurality. The actual position of the nozzle (or nozzles) radially about the cylinder is a matter of choice set by the requirement of good fuel/gas/air mixing. In ordering the instant device, the user would specify the type of throttle body, separate air filter, duct size, and power requirements. The manufacturer would then position the injection aperture (or apertures) spray nozzle (or nozzles) before releasing the device to the customer. Although two nozzles are shown, the device can accept a plurality of such nozzles, and a single nozzle may be acceptable.

FIG. 7 shows the second embodiment of the instant device in place within an air duct. Not shown are clamps that would hold the air ducting, 25 and 26, to the body, 20, and clamps, or other mounting devices, which would support the device (as and if necessary) to the engine or vehicle frame. This embodiment would be used on vehicles that are supplied with air ducting between the air filter (or air intake) and the fuel control system.

The embodiment of FIG. 7 would certainly be employed if there were limited space within the engine compartment.

For example, if the first embodiment, when placed on the throttle body, causes the air filter to extend above the hood line, then the second embodiment would be used. Note the first embodiment could still be used. The user would place the adapter on the throttle body and tighten it in place. Air ducting would then be run from the upper lip of the adapter (which is similar to the second embodiment) to the air filter.

The second embodiment further allows the user the luxury of mounting the adapter anywhere on the vehicle. I.e., mounting it outside the engine compartment.

Figure 8A:
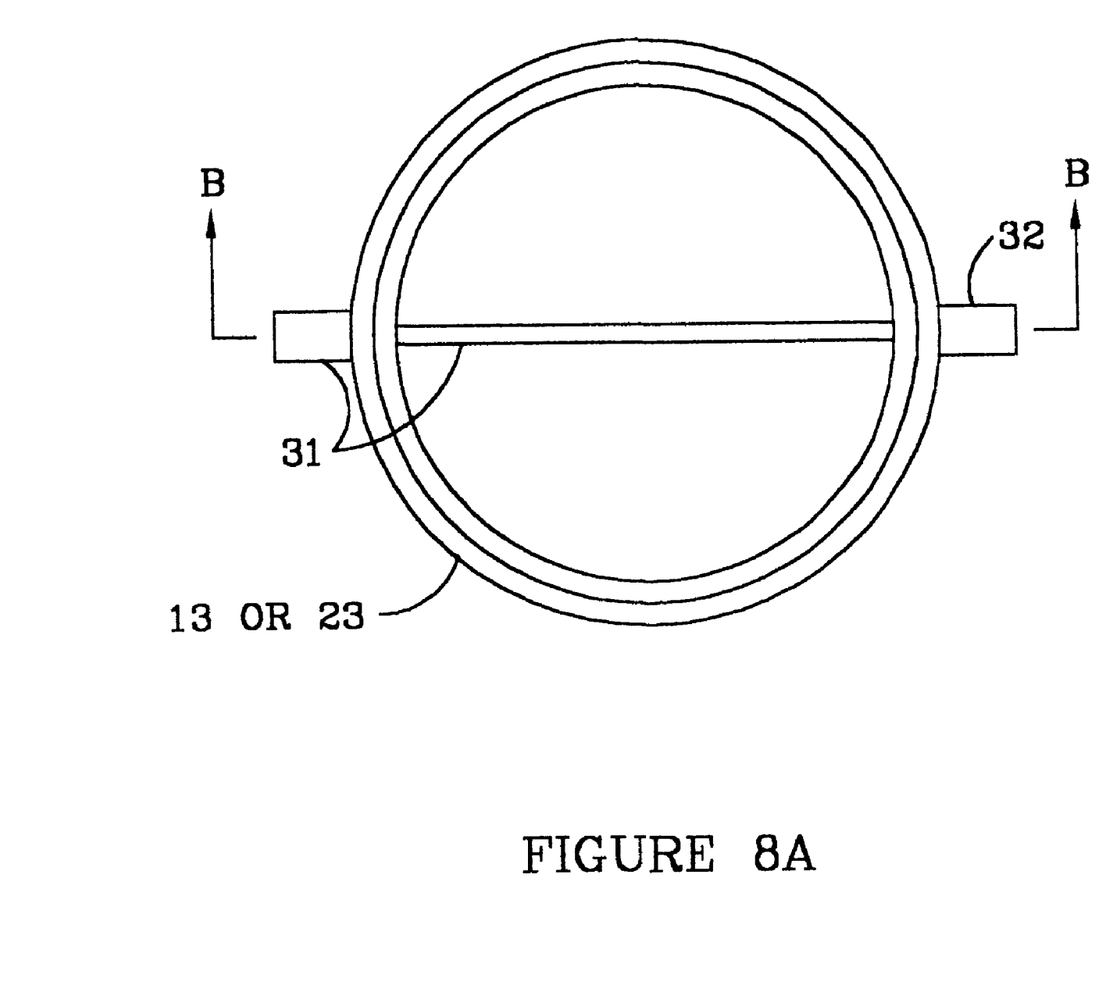
FIG. 8A is a plan view of either of the embodiments of the instant device showing an alternative fuel/nitrous oxide injection assembly known as a spray bar pair.
Figure 8B:
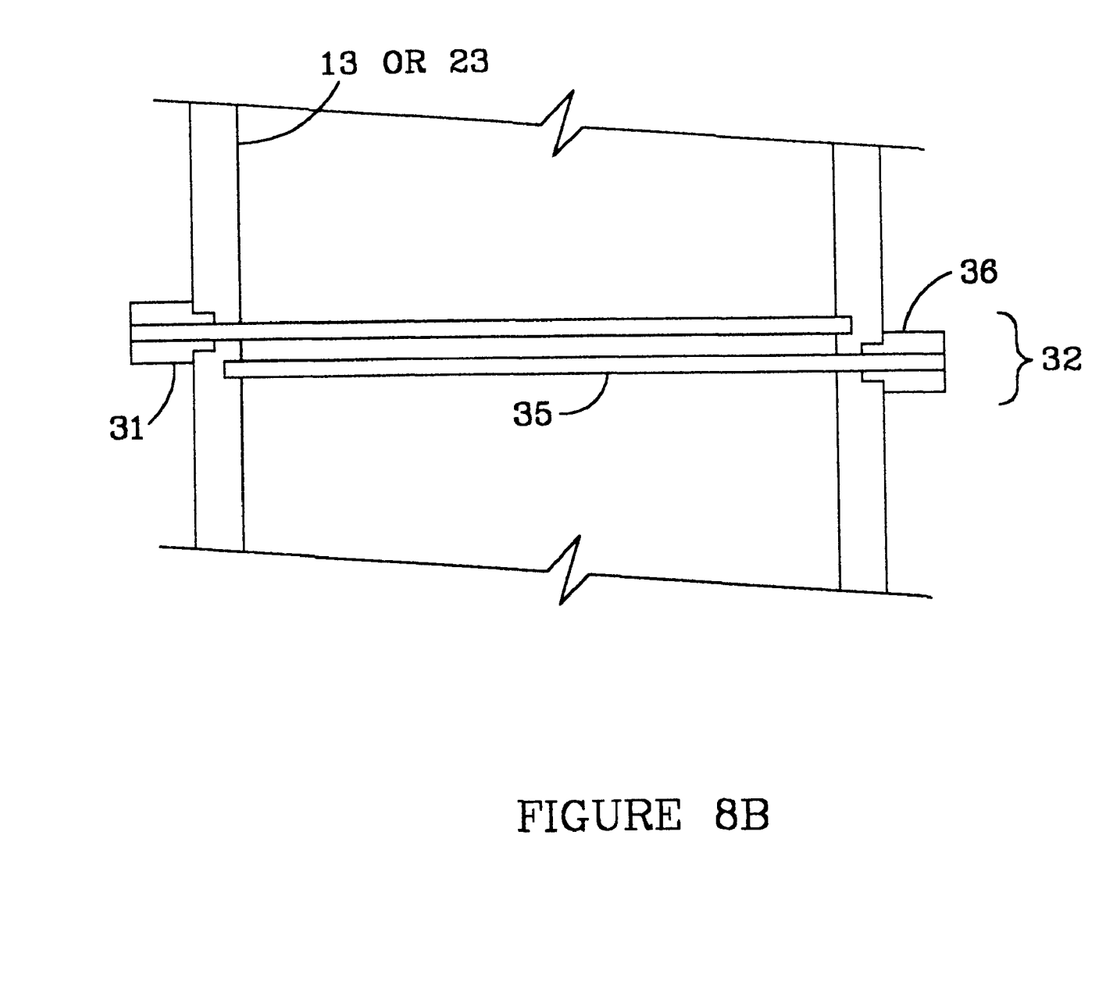
FIG. 8B is a cross-sectional view of the device of FIG. 8A taken at B—B.

FIGS. 8A and 8B show how either embodiment of the instant device can utilize an alternate injection method to the fuel/gas nozzle assembly as shown in FIGS. 1–7. The first alternative is known as a spray bar pair. The spray bar pair consists of an upper spray bar assembly, 31, and a lower spray bar assembly, 32. A spray bar assembly consists of a conduit, 35, that in turn terminates in a fitting, 36. These parts are clearly shown in FIG. 8B but only on the lower spray bar assembly, 32. The conduit has a plurality of small apertures (not shown) through which fuel (in the case of an assembly coupled to fuel) or nitrous oxide (in the case of an assembly coupled to nitrous oxide) is injected into the interior of the power ring.

The spray bar pair, like the nozzles of FIGS. 1–7, are placed midway between the lips of the instant device. One end of each spray bar terminates in the wall of the device; whereas, the other end of the spray bar, which is attached to its respective fitting, penetrates the wall of the device. The spray bar assembly is held in place by the fitting that may be welded or screwed into the wall of the instant device. (The method of attachment would be a manufacturing choice.) One of the fittings is then attached to the fuel manifold and the other to the nitrous oxide manifold, as are the fittings associated with the nozzle.)

Figure 9A:
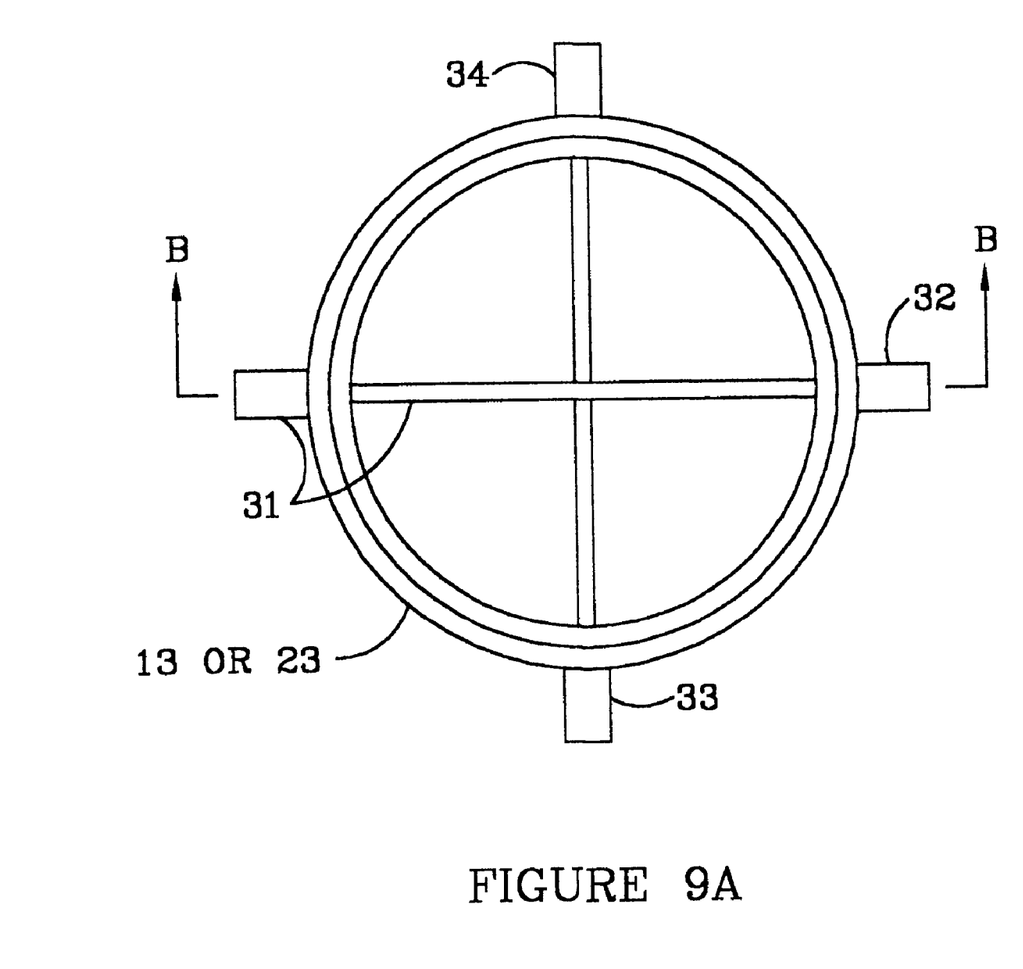
FIG. 9A is a plan view of either of the embodiments of the instant device showing an alternative fuel nitrous oxide injection assembly known as a crossed spray bar pair.
Figure 9B:
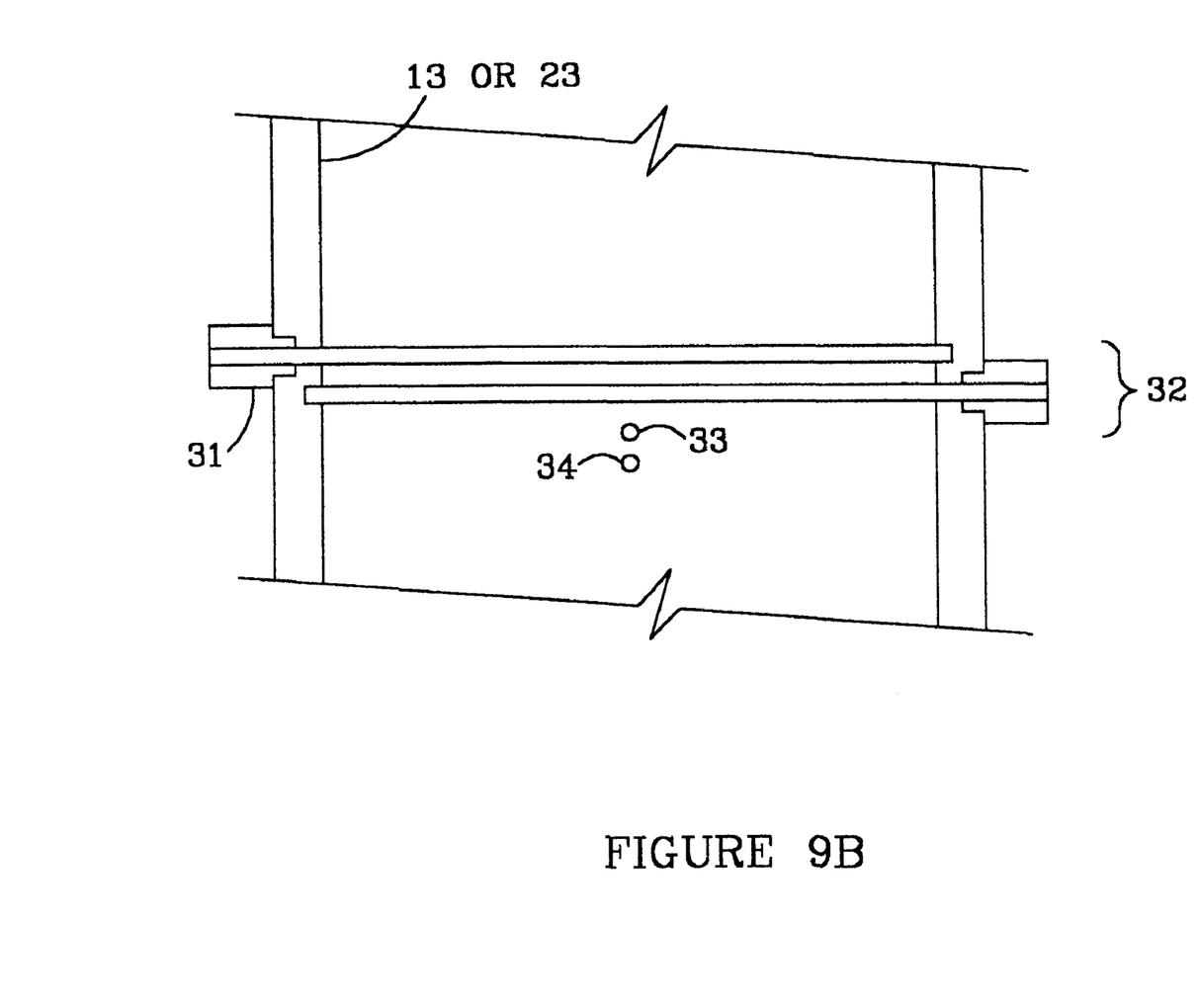
FIG. 9B is a cross-sectional view of the device of FIG. 9A taken at B—B.
Figure 10:
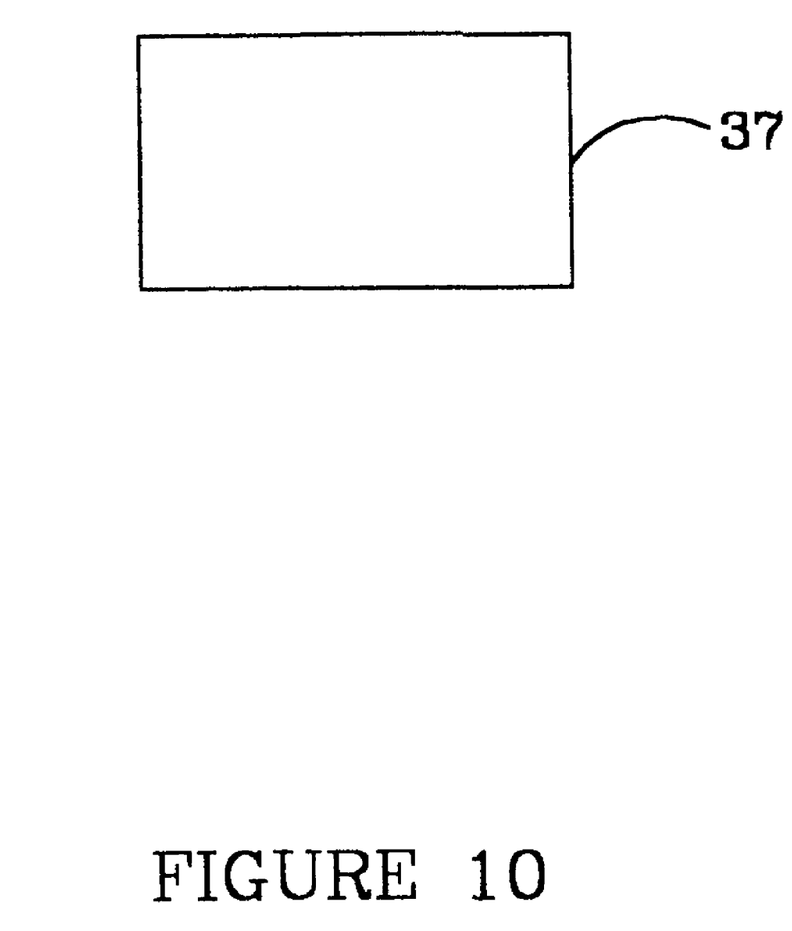
FIG. 10 is a plan view of a plug for closing off unwanted injection apertures.

FIGS. 9A and 9B show a second alterative to the fuel/gas nozzle assembly. The second alternative is known as a crossed spray bar pair. The crossed spray bar pair consists of a first spray bar pair having an upper spray bar assembly, 31, and a lower spray bar assembly, 32; and a second spray bar pair having an (lower) upper spray bar assembly, 33, and a (lower) lower spray bar assembly, 34. The two spray bars pairs are inserted into the instant device orthogonally to each other. The crossed spray bars pairs would be inserted into the device as described in the preceding paragraph. Connections to the fitting would be made in a similar manner.

The dimensions given in this disclosure are set by design criteria based on the throttle body throat size or air ducting size on which or in which the device may be used. Adjustments in dimensions to meet the varying sizes of conditions are considered to be an important part of this disclosure and readily follow from the material. For example, the depth of the lips in either embodiment may be increased or decreased from 0.2 inches, as may the height of same be increased or decreased. The diameter of the cylinder is set by the stock engine and may be increased or decreased.

It would be possible to manufacture a basic series of embodiments that have extra injection nozzles placed about the circumference of the adapter. The manufacturer would then place the required injectors in suitable apertures and plug the unused apertures with a suitable plug. Such approach is within the scope of this invention.

There has been disclosed the best mode and two preferred embodiments. The choice of diameter and width given in this disclosure produces the best results under the highest number of operating conditions.

We claim:

1. A power ring adapter assembly interposed between the basic fuel control system and the air filter of the engine of a vehicle comprising:

a circular body having an upper end, a lower end, an inner surface, an outer surface, and an interior;

an upper lip located at said upper end, wherein said upper lip has an outside surface and an inside surface, wherein said inside surface thereof lies along an extension line of said inside surface of said body, and wherein said outside surface thereof is set back from an extension line of said outside surface of said body;

a lower lip located at said lower end, wherein said lower lip has an outside surface and an inside surface, wherein said outside surface thereof lies along an extension line of said outside surface of said body, and wherein said inside surface thereof is set back from an extension line of said inside surface of said body;

means for injecting fuel and nitrous oxide into said interior for use by the engine; and, one or more injection apertures located midway between said upper end and said lower end of said body for receiving said means for injecting fuel and nitrous oxide.

2. The power ring adapter assembly of claim 1 wherein said means for injecting fuel and nitrous oxide is a fuel-gas nozzle.

3. The power ring adapter assembly of claim 1 wherein said means for injecting fuel and nitrous oxide is a fuel-gas nozzle.

4. The power ring adapter assembly of claim 1 wherein said means for injecting fuel and nitrous oxide is a spray bar pair.

5. The power ring adapter assembly of claim 1 wherein said means for injecting fuel and nitrous oxide is a crossed spray bar pair.

6. The device of claim 1 wherein one or more injection means are placed within one or more of said plurality of injection apertures and whereas any remaining injection apertures are plugged.

7. A power ring adapter assembly interposed between the basic fuel control system and the air filter of the engine of a vehicle comprising:

a circular body having a first end, a second end, an inner surface, an outer surface, and an interior;

a first lip located at said first end; wherein said first lip has an outside surface and an inside surface, wherein said inside surface thereof lies along an extension line of said inside surface of said body, and wherein said outside surface thereof is set back from an extension line of said outside surface of said body, a second lip located at said second end, wherein said second lip has an outside surface and an inside surface, wherein said inside surface thereof lies along an extension line of said inside surface of said body, and wherein said outside surface thereof is set back from an extension line of said outside surface of said body;

means for injecting fuel and nitrous oxide into said interior for use by the engine; and, one or more injection apertures located midway between said first end and said second end of said body for receiving said means for injecting fuel and nitrous oxide.

8. The power ring adapter assembly of claim 7 wherein said means for injecting fuel and nitrous oxide is a spray bar pair.

9. The power ring adapter assembly of claim 7 wherein said means for injecting fuel and nitrous oxide is a crossed spray bar pair.

10. The device of claim 7 wherein one or more injection means are placed within one or more of said plurality of injection apertures and whereas any remaining injection apertures are plugged.

11. A method for using a power ring adapter, incorporating a fuel-gas injection means, on an engine having a basic fuel control system and an air filter comprising the steps of:

a) removing the air filter;

b) placing the power ring adapter over the basic fuel control system; and, c) placing the air filter over the power ring adapter.

12. A method for using a power ring adaptor having two ends, incorporating a fuel-gas injection means and having two ends, on an engine in an engine compartment having a basic fuel control system and an air filter, but with limited space in the engine compartment, comprising the steps of:

a) removing the air filter;

b) placing the power ring adapter over the basic fuel control system; and c) connecting the other end of the power ring adapter to an air filter.

13. The method of claim 12 wherein steps (b) through (c) are replaced with the following steps:

b) mounting the power ring adapter inside the engine compartment;

c) connecting one end of the power ring adapter to the basic fuel control system with a length of air duct; and, d) connecting the other end of the power ring adapter to an air filter.

14. The method of claim 13 wherein steps (b) is replaced with the following steps:

b) mounting the power ring adapter outside the engine compartment.

15. A method for using a power ring adapter, incorporating a fuel-gas injection means, on an engine having a basic fuel control system, an air filter, and intake air ducting comprising the steps of:

a) placing the power ring adapter in the air intake duct between the air filter and the basic fuel control system; and, b) mounting the power ring adapter inside the engine compartment.

16. The method of claim 15 wherein step (a) is replaced with the following step:

a) mounting the power ring adapter outside the engine compartment.

* * * * *